(12) United States Patent
Shen et al.

(10) Patent No.: US 10,872,251 B2
(45) Date of Patent: Dec. 22, 2020

(54) AUTOMATED ANNOTATION TECHNIQUES

(71) Applicant: Tesla, Inc., Palo Alto, CA (US)

(72) Inventors: Anting Shen, Berkeley, CA (US); Forrest Nelson Iandola, San Jose, CA (US)

(73) Assignee: Tesla, Inc., Palo Alto, CA (US)

(*) Notice: Subject to any disclaimer, the term of this patent is extended or adjusted under 35 U.S.C. 154(b) by 50 days.

(21) Appl. No.: 16/031,965

(22) Filed: Jul. 10, 2018

(65) Prior Publication Data
US 2020/0019799 A1    Jan. 16, 2020

(51) Int. Cl.
*G06K 9/00* (2006.01)
*G06T 7/73* (2017.01)
*G06N 3/04* (2006.01)
*G06N 5/04* (2006.01)

(52) U.S. Cl.
CPC ..... *G06K 9/00825* (2013.01); *G06K 9/00671* (2013.01); *G06N 3/0445* (2013.01); *G06N 5/046* (2013.01); *G06T 7/75* (2017.01); *G06T 2207/30252* (2013.01); *G06T 2210/12* (2013.01)

(58) Field of Classification Search
CPC .. G06K 9/00825; G06K 9/00671; G06T 7/75; G06T 2207/30252; G06T 2210/12; G06N 3/0445; G06N 5/046
USPC .......................................................... 382/103
See application file for complete search history.

(56) References Cited

U.S. PATENT DOCUMENTS

2019/0138826 A1* 5/2019 Ghafarianzadeh .......................... G06K 9/00671

* cited by examiner

*Primary Examiner* — Huy C Ho
(74) *Attorney, Agent, or Firm* — Knobbe, Martens, Olson & Bear, LLP

(57) ABSTRACT

An annotation system provides various tools for facilitating training data annotation. The annotation tools include a bidirectional annotation model that generates annotations for an image sequence based on both forward information and backward information in an image sequence. The annotation system also facilitates annotation processes by automatically suggesting annotations to the human operator based on a set of annotation predictions and locations of interactions of the human operator on the image. This way, the annotation system provides an accelerated way to generate high-quality annotations that take into account input from a human operator by using the predictions as a guide when it appears that an estimated annotation is consistent with the judgement of the human operator. The annotation system also updates annotations for an overlapping set of objects based on input from human operators.

20 Claims, 11 Drawing Sheets

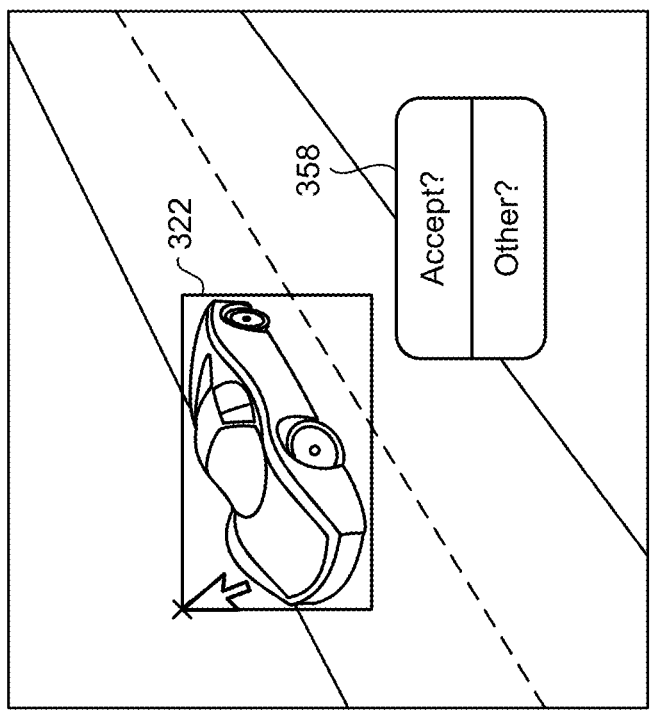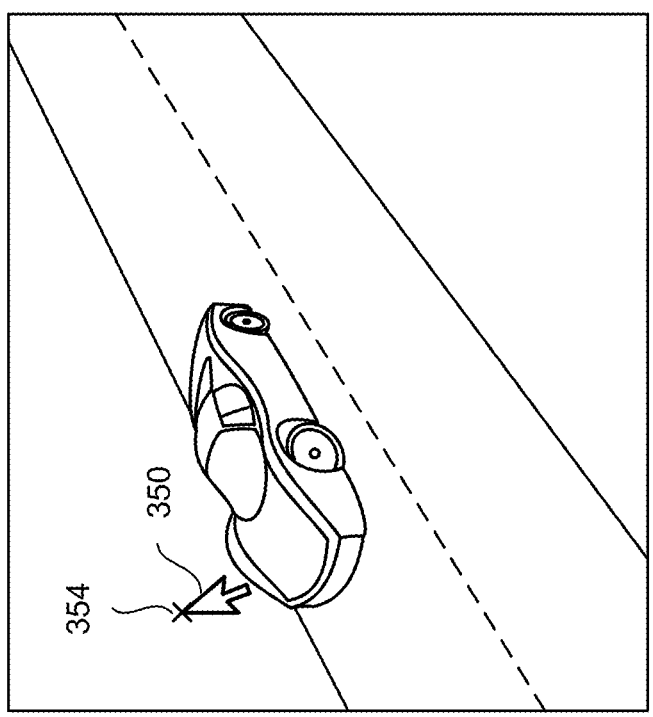
FIG. 3B

AUTOMATED ANNOTATION TECHNIQUES

BACKGROUND

This invention relates generally to autonomous control systems, and more particularly to training computer models for autonomous control systems.

Autonomous control systems are systems that guide vehicles (e.g., automobiles, trucks, vans) without direct guidance by human operators. Autonomous control systems analyze the surrounding physical environment in various ways to guide vehicles in a safe manner. For example, an autonomous control system may detect and/or track objects in the physical environment, and responsive to a detected object, guide the vehicle away from the object such that collision with the object can be avoided. As another example, an autonomous control system may detect boundaries of lanes on the road such that the vehicle can be guided within the appropriate lane with the flow of traffic.

Often times, autonomous control systems use computer models to perform algorithms for analyzing the surrounding environment and performing detection and control operations. The computer models are trained using training data sets of images, videos, and the like that resemble potential environments the autonomous control system would encounter during operation. In preparation for the training process, portions of the training data, such as various objects of interest, are annotated. Computer models configured to detect objects can learn representations of the objects through these annotations. For example, annotations for an image of a street may be regions of the image that contain pedestrians. A computer model for detecting pedestrians on the street may learn representations of people from the annotated images.

Typically, the annotations are generated by human operators who review and label the data through annotation tools. Annotation tools may include graphical user interfaces (GUI) that allow the human operator to mark, draw, or otherwise label the regions of interest. For example, an annotation tool may allow an operator to draw bounding boxes around pedestrians in the street image. This process can be tedious and costly, especially if a large amount of the training data needs to be annotated. Annotation tools may also include annotation models that automatically label the training data without human input. However, existing annotation models often have sub-optimal accuracy, and still require significant human input to correct these inaccuracies.

SUMMARY

An annotation system provides various tools for facilitating training data annotation. The annotation tools include a bidirectional annotation model that generates annotations for an image sequence. The image sequence includes a set of images that are related by time, such as a set of video frames or animation frames. For example, an image sequence may include a series of images depicting a pedestrian walking across a street. The annotated sequence can be used, for example, to train a model that processes video content. Compared to a set of static images, annotation models can take advantage of the similarity between images in the sequence, since they often depict the same scene at different points in time.

Although various types of processes can be used to annotate image sequences, many annotation models label a given image using forward information containing locations of the desired objects in previous images of the sequence. These may be known or estimated annotations in the previous images. For example, an annotation model may label the pedestrian in a given image based on the estimated locations of the pedestrian in earlier images of the sequence. However, this does not take into account the locations of the objects in future images of the sequence that can be significantly useful for annotation purposes. For example, the destination location of the pedestrian in the last image may be useful for annotating the location of the pedestrian in an intermediate image.

In one embodiment, the annotation system trains and uses the bidirectional machine-learned model that generates annotations based on both forward information and backward information in an image sequence. In one embodiment, the bidirectional annotation model is a neural network model, such as a bidirectional recurrent neural network model (RNN), or a bidirectional long short-term memory model (LSTM).

The annotation system generates annotations in an image sequence by applying a bi-directional machine-learned model to the sequence of images. Specifically, the annotation system generates a first set of estimated annotations by propagating a first image in the sequence in a forward direction through the bi-directional annotation model. An annotation in the first set is determined based on known or estimated annotations in previous images. The annotation system generates a second set of estimated annotations by propagating a last image in the sequence in a backward direction through the bi-directional annotation model. An annotation in the second set is determined based on known or estimated annotations in future images. The first set and the second set of estimated annotations are combined to generate the final set of annotations for the image sequence. This way, the annotation system can label training data with improved accuracy by jointly taking into account both forward and backward information of the sequence.

In one embodiment, the annotation system facilitates annotation processes by automatically suggesting annotations to the human operator based on a set of annotation predictions. Typically, an annotation model generates a set of annotation predictions for an image that each indicate, for example, an estimated likelihood that it contains the objects of interest. An annotation system selects the annotation with the highest likelihood, and displays the selection to a human operator. The human operator can verify the annotation, or re-draw the annotation if inaccurate. Often times, annotation models have less than optimal accuracy, and a significant amount of human input may be required to redraw the selected annotations. Moreover, a majority of the predictions generated by the annotation model are discarded and do not make their way into the annotation process, even though they may contain better options than the selection.

In such an embodiment, the annotation system automatically suggests annotations based on locations of interactions of the human operator with an image. Specifically, the annotation system generates a set of predictions for an image through an annotation model. The annotation system generates the interface for a human operator that displays the image but does not display the set of estimated annotations. Responsive to a human operator interacting with a location of an annotation on the interface, the annotation system displays the corresponding annotation on the image for validation by the human operator. The locations of the interaction may correspond to various characteristic locations of the annotations if the annotations were displayed on the image. The interaction may be, for example, the human operator hovering a pointer with, for example, a pointing device over a location corresponding to the boundary of the annotation.

This way, the annotation system provides an accelerated way to generate high-quality annotations that take into account input from a human operator by using the predictions as a guide when it appears that an estimated annotation is consistent with the judgement of the human operator. Moreover, since the large number of predictions are not displayed on the interface, the human operator can provide guidance on the location of the objects in an unbiased manner and without the clutter generated by simultaneously displaying a large number of annotations.

In one embodiment, the annotation system updates annotations based on input from human operators. In one instance, the interface can be used to improve predictions generated by an annotation model for an overlapping set of objects in an image. Specifically, predictions generated by annotation models can include annotations that lump the overlapping objects into a single label, often times with similar or even higher likelihoods for selection than those that correctly identify the individual objects. For example, an image may contain two vehicles in which one is occluded behind the other, and an annotation model may generate a prediction in which both vehicles are contained in a single bounding box. Typically, a human operator is required to correct the annotations when such an annotation is selected for the image.

In such an embodiment, the annotation system updates annotations for an overlapping set of objects based on input from human operators. Specifically, the annotation system displays an image on the client device. The selected annotation for the image may be an incorrect annotation that groups the set of objects an image into a single label. The annotation system receives annotations generated by the human operator that correctly identify one or more individual objects in the overlapping set. Based on the input, the annotation system automatically suggests annotations for the remaining objects that were not annotated by the human operator. For example, responsive to a human operator labeling an individual vehicle, the annotation system may automatically suggest a bounding box for the occluded vehicle. Thus, the annotation system can quickly suggest annotations for the remaining objects based on the input when an operator provides input for an incorrect annotation.

BRIEF DESCRIPTION OF THE DRAWINGS

FIG. 3B illustrates an example process of automatically suggesting annotations based on human interaction on a client device, according to an embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

High-Level Overview

Figure 1:
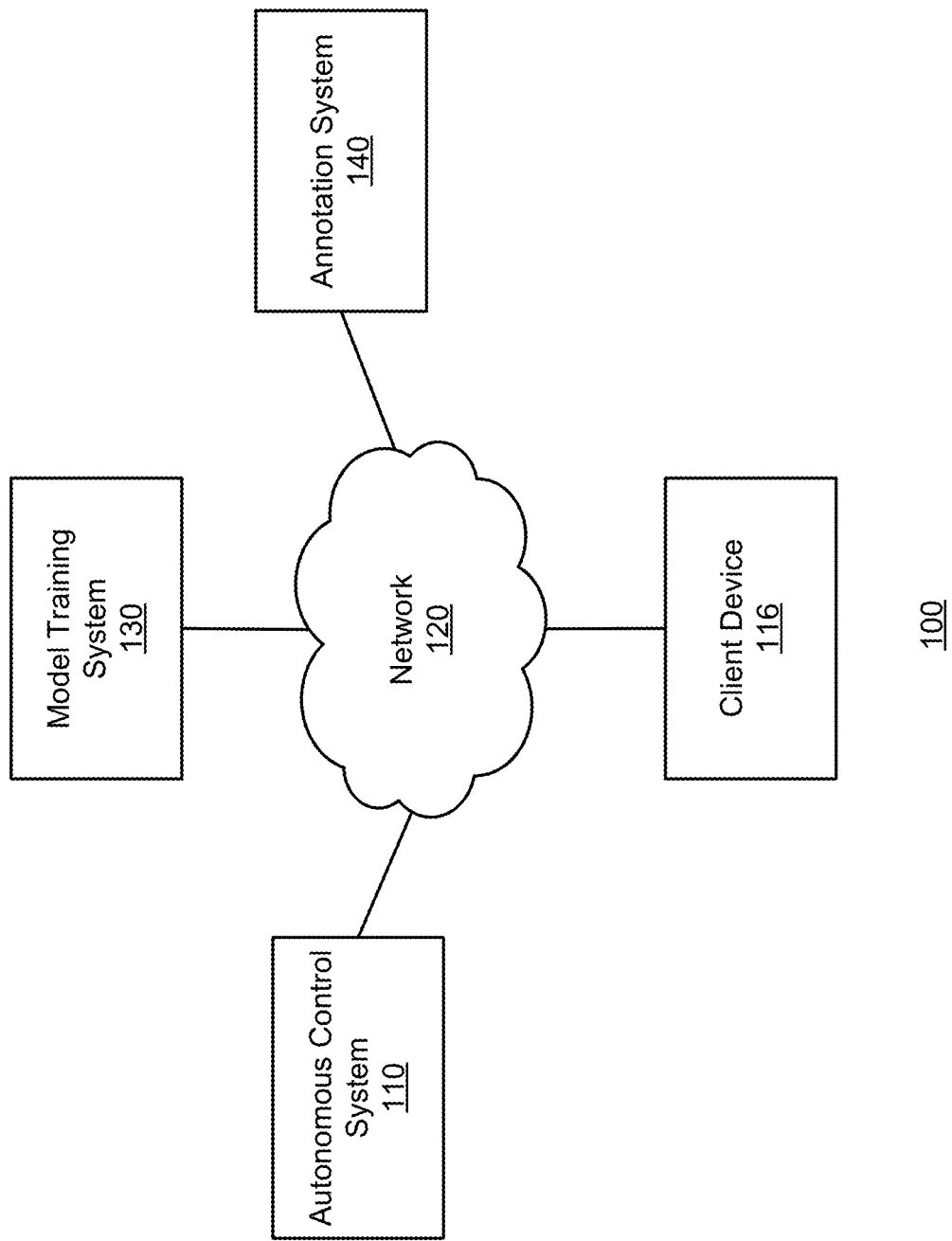
FIG. 1 is an example network environment for an annotation system, according to an embodiment.

FIG. 1 is an example network environment 100 for an annotation system 140, according to an embodiment. The network environment 100 includes an autonomous control system 110, a model training system 130, an annotation system 140, and one or more client devices 116 coupled to a network 120.

The autonomous control system 110 guides vehicles based on information related to the surrounding environment received from the one or more sensors attached to the vehicles. The vehicles are any means of conveyance or transport in or by which someone or something can travel from one place to another, and may include automobiles, trucks, vans, robotic transports, and the like. The autonomous control system 110 may guide a vehicle through one or more trips from one destination to another. For example, the autonomous control system 110 may guide a ride-sharing vehicle (e.g., a taxi) from a passenger's point of pick-up to their desired destination.

Though described herein as an autonomous vehicle, the control decisions of the autonomous controls system may provide semi-autonomous control rather than complete control of the vehicle, for example to supplement or override user control, or as primary means of control that can be overridden by a user. In addition, although the autonomous control system 110 is described herein as a system that guides vehicles, the autonomous control system 110 may also guide other systems such as robotic arms or manufacturing equipment.

One or more sensors are attached to the vehicles to gather information used to generate the control of the vehicle. The sensors are devices that detect information related to the physical environment. The information can be captured through many forms. For example, the sensors may be imaging sensors that capture scenes of the physical environment through a series of one or more images. In such an example, other vehicles proximate to the vehicle of the autonomous control system, stationary objects such as trees, fire hydrants, lamp posts, and the like may be captured in the images. As another example, the sensors may be geo-locational sensors, and more specifically global positioning system (GPS) sensors that detect the position of the sensor (and its attached vehicle) relative to a map of the physical environment. As yet another example, the sensors may be microphones that detect sounds in the environment in the form of audio signals. As defined herein, sensor data of a sensor denotes the readings of the environment collected by the sensor that characterize how the sensor perceives the environment. Example sensors may include light detection and ranging (LIDAR) sensors, radio detection and ranging (RADAR) sensors, cameras, microphones, and the like.

The autonomous control system 110 performs various detection and control algorithms based on sensor data to guide the vehicles in a safe and efficient manner. For example, the autonomous control system 110 may detect various objects (e.g., lamp post, cars) that are proximate to a vehicle in the captured sensor data of the environment, and guide the vehicle away from the objects to prevent collision of the vehicle with the objects. As another example, the autonomous control system 110 may detect boundaries of lanes on the road such that the vehicle can be guided within the appropriate lane with the flow of traffic. Other examples also include simulating sensor data, estimating sensor quality, and the like.

In one embodiment, various functions of the autonomous control system 110 are performed through machine-learned computer models. In one embodiment, the machine-learned models are neural network models such as feed-forward networks, convolutional neural networks (CNN), deep neural networks (DNN), recurrent neural networks (RNN), self-organizing maps (SOM), and the like, that are trained by the model training system 130 based on training data.

The model training system 130 trains machine-learned computer models for use in the autonomous control system 110. The computer models are trained using training data. The training data is historical sensor data resembling potential environments the autonomous control system 110 would encounter during operation. In one instance, portions of the training data, such as various objects of interest, are annotated with labels. Computer models configured to detect objects, for example, can learn representations of the objects through these annotations. As an example, annotations for a training data set may include labels indicating regions of the image that contain pedestrians. The computer model for detecting pedestrians on the street may learn different representations of people from the annotated data set. The model training system 130 receives annotated training data from the annotation system 140.

The annotation system 140 provides annotated training data to the model training system 130. The annotations represent a desired type of metadata that correspond to the type of data the computer models are configured to predict. For example, annotated regions containing pedestrians can be used to train a computer model that outputs likelihoods that a region of an image contains a pedestrian. In one instance, the annotations are in the form of bounding boxes that enclose objects of interest, preferably within the smallest area or volume possible. In another instance, the annotations are in the form of labels that partition an image into different segments. A pixel or groups of pixels in the image may be assigned a label such that pixels with the same labels share certain characteristics.

For the sake of illustration, annotation techniques introduced herein are described with respect to images or videos that are visual representations of sensor data. For example, the images may be LIDAR point cloud maps, camera images, RADAR maps, and the like. However, it is appreciated that the techniques can be applied to other types of data.

The annotation system 140 typically uses various annotation tools in conjunction with input from human operators to annotate data. Annotation tools may include interfaces, such as graphical user interfaces (GUI), that allow the human operator to verify existing annotations, or mark, draw, or otherwise label regions of interest on an image. For example, a GUI may allow an operator to draw bounding boxes around pedestrians in the street image. However, this process can be tedious and costly for human operators, especially if a large amount of the training data needs to be annotated. Annotation tools may also include annotation models that automatically generate annotations on the training data without human input. However, existing annotation models often have suboptimal accuracy, and still require significant human input to correct.

Thus, the annotation system 140 provides various methods for facilitating training data annotation. In one embodiment, the annotation system 140 trains a bidirectional annotation model that generates annotations for an image sequence. The image sequence includes a set of images that are related by time, such as a set of video frames or animation frames. For example, an image sequence may include a series of images depicting a pedestrian walking across a street. The annotated sequence can be used, for example, to train a model that processes video content. Compared to a set of static images, annotation models can take advantage of the similarity between images in the sequence, since they often depict the same scene at different points in time.

Although various types of processes can be used to annotate image sequences, many annotation models label a given image using forward information containing locations of the desired objects in previous images of the sequence. These may be known or estimated annotations in the previous images. For example, an annotation model may label the pedestrian in a given image based on the estimated locations of the pedestrian in earlier images of the sequence. However, this does not take into account backward information containing the locations of the objects in future images of the sequence that can be useful for annotation purposes. For example, the resulting destination of the pedestrian in the last image may be useful for annotating the location of the pedestrian in an intermediate image.

In such an embodiment, the annotation system 140 trains and uses the bidirectional machine-learned model that generates annotations based on both forward information and backward information in an image sequence. The annotation model is configured to receive a sequence of images and generate annotations for each image in the sequence. In one embodiment, the bidirectional annotation model is a neural network model, such as a bidirectional recurrent neural network model (RNN), or a bidirectional long short-term memory model (LSTM).

Specifically, the annotation model includes a plurality of nodes associated with a forward state that indicates forward information for an image, and a plurality of nodes associated with a backward state that indicates backward information for the image. The annotation system 140 generates a set of forward states by propagating the first image in the sequence in a forward direction through the bidirectional model. The forward state for a given image is generated based on the forward states of previous images in the sequence. The annotation system 140 generates a second set of backward states by propagating the last image in the sequence in a backward direction through the bidirectional model. The backward state for a given image is generated based on the backward states of future images in the sequence. The annotation system 140 generates annotations for each image by combining the forward states and backward states. Thus, the annotation system 140 can label training data with improved accuracy by jointly taking into account both forward and backward information in the sequence. The annotation system 140 can optionally provide the annotated sequence of images to client devices 116, such that human operators can confirm the accuracy of the annotations.

Figure 2:
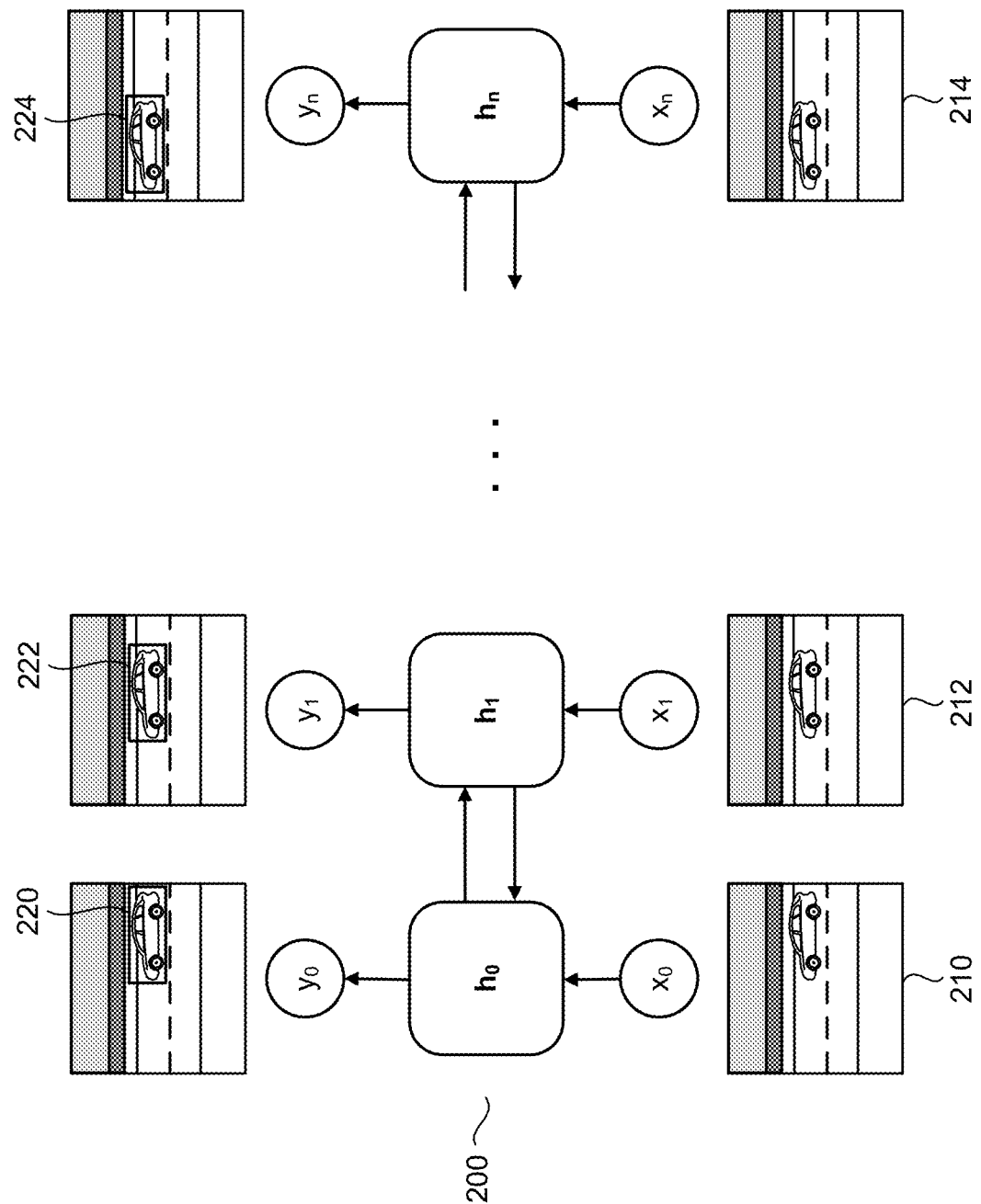
FIG. 2 illustrates an example process of generating annotation predictions using a bidirectional annotation model, according to an embodiment.

FIG. 2 illustrates an example process of generating annotation predictions using a bidirectional annotation model, according to an embodiment. As shown in FIG. 2, the input data $\{x_0, x_1, \ldots, x_n\}$ is a video sequence of training images including images 210, 212, and 214 illustrating a vehicle on a highway. The annotation model is configured to generate a set of annotations $\{y_0, y_1, \ldots, y_n\}$ that indicate the locations of bounding boxes around the vehicle. In the example illustrated in FIG. 2, the forward state and backward state of each image is collectively shown as $\{h_0, h_1, \ldots, h_n\}$.

Specifically, the annotation system 140 generates a set of forward states $\{h_{0,f}, k_{1,f}, \ldots, h_{n,f}\}$ by propagating the first image 210 of the sequence through the annotation model 200 in a forward direction. For example, the forward state $h_{1,f}$ for image 212 may be generated based on the forward state $h_{0,f}$ of the previous image 210. The annotation system 140 generates a set of backward states $\{h_{0,f}, k_{1,f}, \ldots, h_{n,f}\}$ by propagating the last image 214 of the sequence through the annotation model 200 in a backward direction. For example, the backward state $h_{1,b}$ for image 212 may be generated based on the backward states $h_{n,b}, h_{n-1,b}, \ldots, h_{2,b}$ of future images in the sequence. The annotation system 140 generates a set of annotations $\{y_0, y_1, \ldots, y_n\}$ by combining the forward states and backward states. For example, the annotation 222 for the image 212 is generated by combining the forward state $h_{1,f}$ and the backward state $h_{1,b}$ for the image 212.

In one embodiment, the annotation system 140 facilitates annotation processes by automatically suggesting annotations to the human operator based on a set of annotation predictions. Typically, an annotation model generates a set of annotation predictions for an image that each indicate, for example, an estimated likelihood that it contains the objects of interest. The annotation system 140 selects the annotation with the highest likelihood, and displays the selection to a client device 116 associated with a human operator. The human operator can verify the annotation, or if the annotation is inaccurate, redraw the label for the annotation. Often times, annotation models have less than optimal accuracy, and a significant amount of human input may be required to redraw the selected annotations. Moreover, a majority of the predictions generated by the annotation model are discarded and do not make their way into the annotation process, even though they may contain better options than the selection.

In such an embodiment, the annotation system 140 automatically suggests annotations based on locations of interactions of the human operator with an image. The suggested annotations may be predictions generated by an annotation model. Specifically, the annotation system 140 generates a set of predictions for an image through a model. The annotation system 140 generates the interface for a human operator that displays the image but does not display the set of estimated annotations. Responsive to a human operator interacting with a location on the image, the annotation system 140 automatically suggests an annotation based on the location of the interaction. In one instance, the interaction is the human operator hovering a pointer with, for example, a pointing device over a location on the image. The annotation system 140 identifies one or more predictions that have boundaries containing the location of the interaction, and suggests the annotations on the interface.

This way, the annotation system 140 provides an accelerated way to generate high-quality annotations without having the operator label the entire annotation itself. The annotation system 140 takes into account input from a human operator by using the predictions as a guide when it appears that an estimated annotation is consistent with the judgement of the human operator. Moreover, since the large number of predictions are not displayed on the interface, the human operator can provide guidance on the location of the objects in an unbiased manner and without the clutter generated by simultaneously displaying a large number of annotations.

Figure 3A:
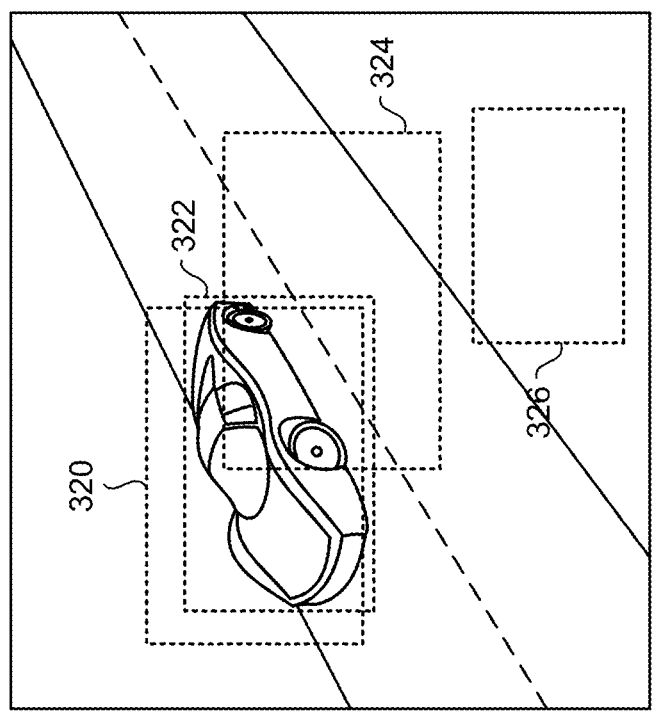
FIG. 3A illustrates an example set of predictions generated by an annotation model, according to an embodiment.

FIG. 3A illustrates an example set of predictions generated by an annotation model, according to an embodiment. As shown in FIG. 3A, the annotation system 140 generates a set of bounding box predictions using an annotation model configured to detect vehicles in an image. Each bounding box may be associated with a likelihood of containing a vehicle in the corresponding region of interest. As examples, FIG. 3A illustrates bounding boxes 320, 322, 324, and 326. Bounding box 326 may be associated with a low likelihood, while bounding boxes 320, 322 may be associated with high likelihoods of containing a vehicle. In particular, bounding box 320 may be associated with a higher likelihood than bounding box 322, even though bounding box 322 is a more accurate choice to a human operator.

FIG. 3B illustrates an example process of automatically suggesting annotations based on human interaction on a client device, according to an embodiment. As shown in FIG. 3B, the annotation system 149 displays an image on a client device 116 of a human operator. The set of annotation predictions are not displayed on the image. The annotation system 140 determines that a human operator has interacted with the image using a pointer 354 at a location 354 on the image. Specifically, the location 354 corresponds to a boundary of bounding box 322 in the set of predictions. Before the human operator labels the bounding box, the annotation system 140 displays the bounding box 322 on the interface and a menu 358 indicating whether the operator would like to accept the annotation or whether the operator would like to pursue other options, such as re-drawing the annotation.

In one embodiment, the annotation system 140 corrects existing annotations based on input from human operators. In one instance, the annotation system 140 corrects predictions for an overlapping set of objects in an image. Specifically, predictions generated by annotation models can include annotations that lump the overlapping objects into a single label, often times with similar or even higher likelihoods for selection than those that correctly identify the individual objects. For example, an image may contain two vehicles in which one is occluded behind the other, and an annotation model may generate a prediction in which both vehicles are contained in a single bounding box. Typically, a human operator is required to relabel the correct annotations when such an annotation is selected for the image.

In such an embodiment, the annotation system 140 corrects annotations for an overlapping set of objects based on input from human operators. Specifically, the annotation system 140 displays an image on the client device 116. The selected annotation for the image may be an incorrect annotation that groups the set of objects into a single label. The annotation system 140 receives annotations generated by the human operator that correctly identify one or more individual objects in the overlapping set. Based on the input, the annotation system 140 automatically suggests annotations for the remaining objects. For example, responsive to a human operator labeling an individual vehicle, the annotation system 140 automatically suggests a bounding box for the occluded vehicle located behind the annotated vehicle on the interface. Thus, the annotation system 140 can quickly suggest annotations for the remaining objects based on the input an operator provides for an incorrect annotation.

Figure 4A:
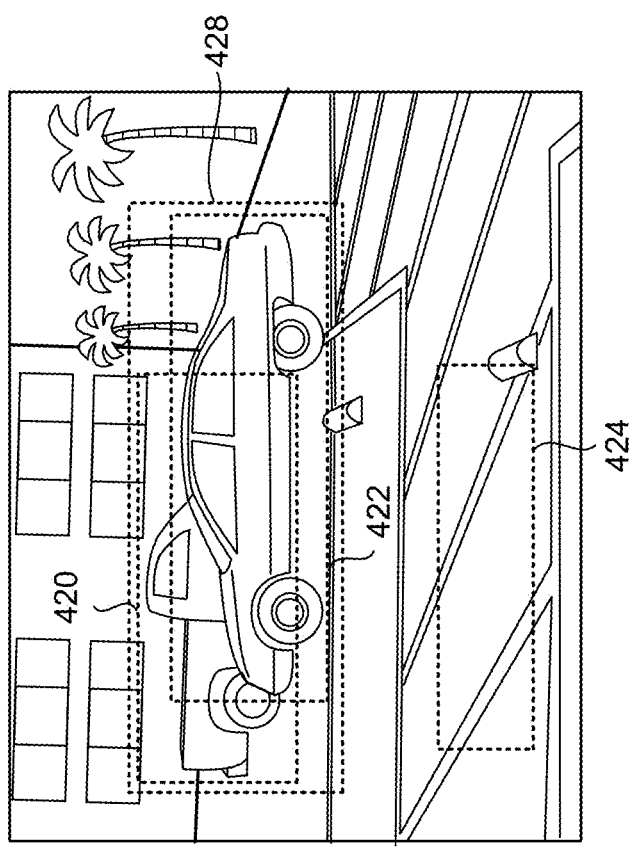
FIG. 4A illustrates an example set of predictions generated by an annotation model for an image containing an overlapping set of vehicles, according to one embodiment.

FIG. 4A illustrates an example set of predictions generated by an annotation model for an image containing an overlapping set of vehicles, according to one embodiment. As shown in FIG. 4A, the annotation system 140 generates a set of bounding box predictions using an annotation model configured to detect vehicles in an image. As examples, FIG. 4A illustrates bounding boxes 420, 422, 424, and 428. Bounding box 420 is an annotation for the occluded back vehicle, while bounding box 422 is an annotation for the front vehicle. In particular, bounding box 428 is an incorrect annotation that contains both overlapping vehicles, but may be chosen as the annotation for the image by an annotation model.

Figure 4B:
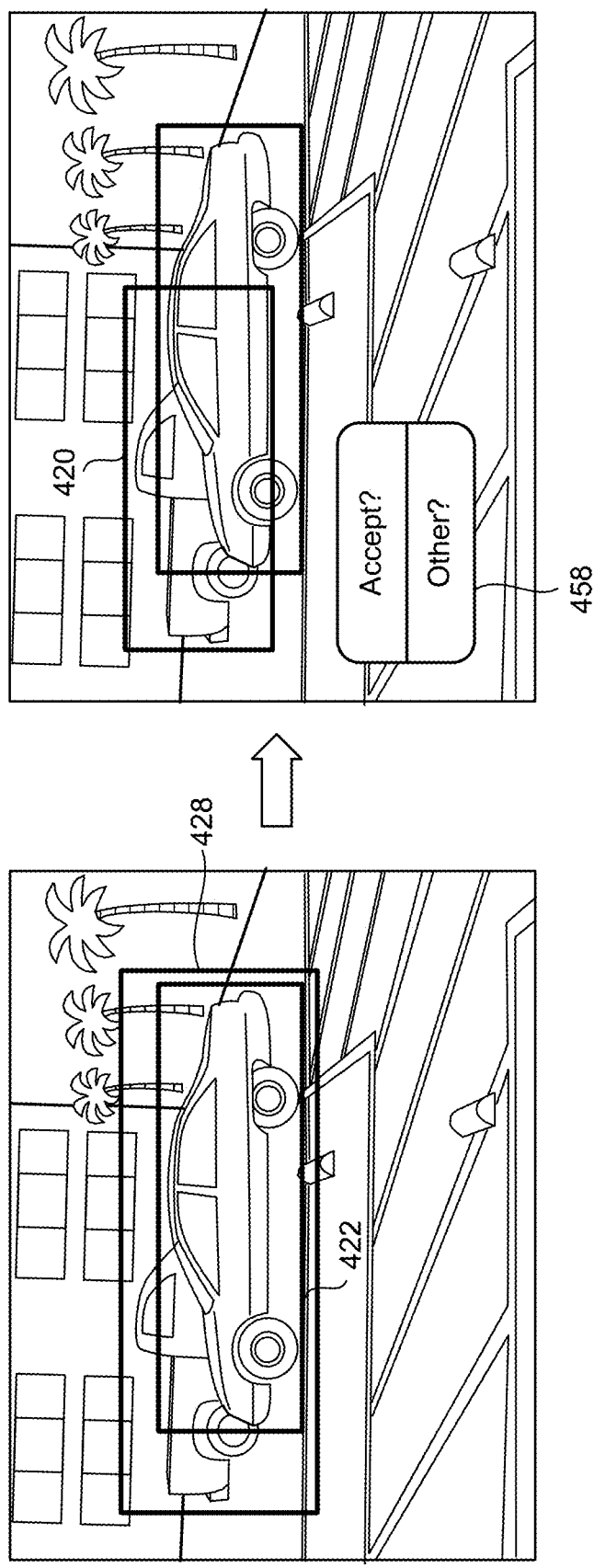
FIG. 4B illustrates an example process of updating annotations based on input from a human operator, according to one embodiment.

FIG. 4B illustrates an example process of updating annotations based on input from a human operator, according to one embodiment. The annotation system 140 displays an image on a client device 116 of a human operator. The selected annotation 428 for the image is also displayed on the interface. As shown in FIG. 4B, the annotation system 140 receives input from the human operator for a bounding box 422 that identifies the front vehicle. Based on the input, the annotation system 140 determines that the original annotation 428 contains multiple objects. The annotation system 140 discards the original annotation 428, and displays an annotation for the occluded back vehicle on the interface, as well as a menu 458 indicating whether the operator would like to accept the annotation or whether the operator would like to pursue other options. In the example shown in FIG. 4B, the annotation system 140 automatically selects bounding box 420 that was previously identified as a prediction from the annotation model for display.

Returning to FIG. 1, the client device 116 is a computing device capable of receiving user input as well as communicating via the network 120. While a single client device 116 is illustrated in FIG. 1, in practice many client devices 116 may communicate with the systems in environment 100. In one embodiment, a client device 116 is a conventional computer system, such as a desktop or laptop computer. Alternatively, a client device 116 may be a device having computer functionality, such as a personal digital assistant (PDA), a mobile telephone, a smartphone or another suitable device. A client device 116 is configured to communicate via the network 120. In one embodiment, a client device 116 executes an application allowing a user of the client device 116 to interact with the annotation system 140. For example, a client device 116 executes a browser application to enable interaction between the client device 116 and the annotation system 140 via the network 120. In another embodiment, the client device 116 interacts with the annotation system 140 through an application programming interface (API) running on a native operating system of the client device 116, such as IOS® or ANDROID™.

The client devices 116 are associated with human operators that provide various forms of guidance to the annotation system 140 regarding annotations on the training data. In one embodiment, the human operators interact with interfaces generated by the annotation system 140 on the client devices 116 to provide guidance on annotations on the training data. For example, a human operator may interact with an interface using a browser application of the client device 116. Specifically, components of the client devices 116 may receive rendering information from the annotation system 140 that can be processed to generate the display elements of the interface on the device.

The human operators perform various tasks using the interface to provide guidance to the annotation system 140, as described in conjunction with the annotation system 140. For example, human operators can review annotations generated by the bidirectional annotation model, and provide feedback on the accuracy of the annotations to the annotation system 140. As another example, human operators can interact with an image at a location that the operator considers to be a possible annotation, and are then displayed with suggested annotations based on the location of their interaction. As yet another example, responsive to receiving an image with an incorrect annotation for an overlapping set of objects, human operators can provide input on annotations for one or more objects in the set, and are then displayed with suggested annotations for the remaining objects. For all of these examples, the human operator can indicate whether the displayed annotations are acceptable, or can request to manually label the annotation through the interface.

The client devices 116 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

Annotation System

Figure 5:
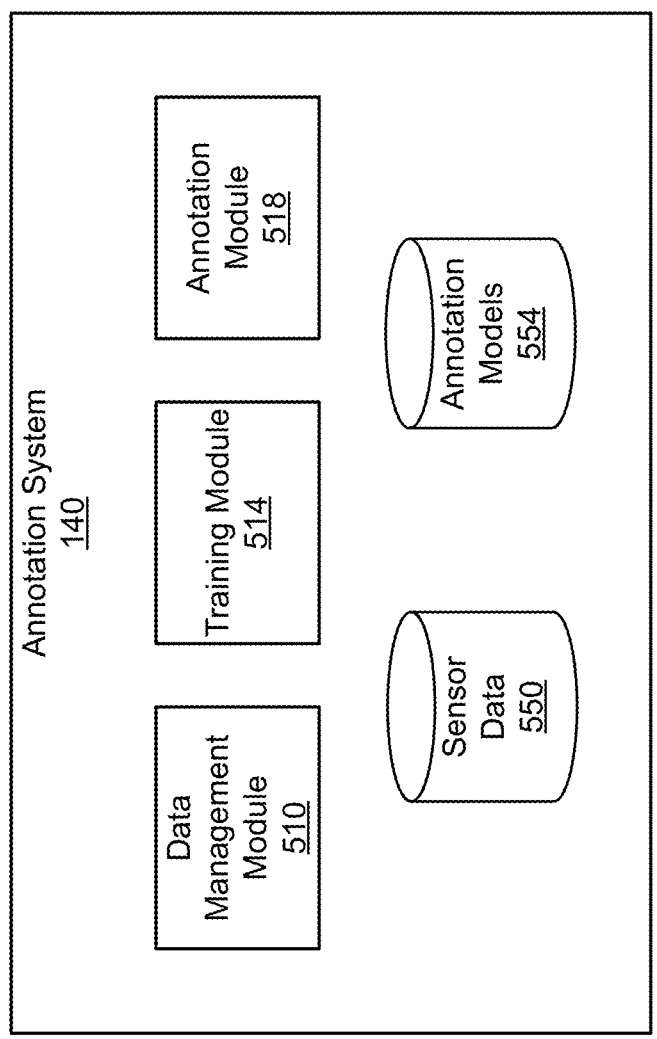
FIG. 5 is an example block diagram of an architecture of the annotation system, in accordance with an embodiment.

FIG. 5 is an example block diagram of an architecture of the annotation system 140, according to one embodiment. The annotation system 140 shown in FIG. 5 includes a data management module 510, a training module 514, and an annotation module 518. The annotation system 140 also includes a sensor data store 550 and an annotation model data store 554. In alternative configurations, different or additional components may be included in the annotation system 140.

The data management module 510 manages the sensor data store 550. The sensor data store 550 includes training data that can be used to train annotation models. The training data contains a set of annotated sensor data that are already verified, for example, by human operators. In one instance, the training data includes sequences of annotated images that can be used to train the bidirectional annotation model. The training data may include sensor data from various types of sensors depending on the type of data the annotation model is configured to receive and predict annotations for. For example, the training data may include images of LIDAR sensors, RADAR sensors, optical cameras, and the like.

In one embodiment, the annotations may be bounding boxes around an object. The bounding boxes may enclose objects of interest such as pedestrians, trees, vehicles, stop signs, and the like that may affect the performance of the autonomous control system 110. In one instance, the bounding boxes are encoded as the coordinates of the vertices of the box on the image. In another embodiment, the annotations may be segmentation labels that assign a label to each pixel in the image depending on whether the objects share certain characteristics. For example, pixels in an image that belong to a tree may be assigned a label of "1," while pixels in the image that belong to a pedestrian may be assigned a label of "2."

The training module 514 trains annotation models configured to receive an image and output an annotation prediction for the image. In one embodiment, the training module 514 trains the bidirectional annotation model that includes a set of learned parameters. The parameters of the bidirectional annotation model are learned from the training data, and learn the relationship between images and the known annotations. The training module 514 determines the values of the parameters by iteratively reducing a loss function. Specifically, the training module 514 repeatedly iterates between a forward pass step and a backward pass step at each iteration to reduce the loss function. The trained annotation models may be stored in the annotation model data store 554.

The values of the parameters are first initialized. During the forward pass step, the training module 514 generates estimated annotations by applying the bidirectional annotation model to the images of the training data. For a given sequence of training images, the training module 514 generates a set of forward states by propagating the first image in the sequence through the bidirectional annotation model in the forward direction. The training module 514 generates a set of backward states by propagating the last image in the sequence through the model in the backward direction. The training module 514 combines the forward states and the backward states to generate the estimated annotations for the sequence.

The training module 514 determines the loss function indicating a difference between the estimated annotations and the verified annotations of the training data. In one embodiment, the loss function is given by:

$$loss = \sum_{i=1}^{n_i} \|y_i - y'_i\|_2^2$$

where $y_i$ denotes the annotation of an image i in a sequence of training images, $y'_i$ denotes the estimated annotation for the image i, and $n_i$ denotes the number of images in the sequence. During the backward pass step, the training module 514 updates the set of parameters to reduce the loss function. The training module 514 may use gradient-based numerical optimization algorithm, such as batch gradient algorithms, stochastic gradient algorithms, and the like to reduce the loss function during the backward pass step.

Figure 6:
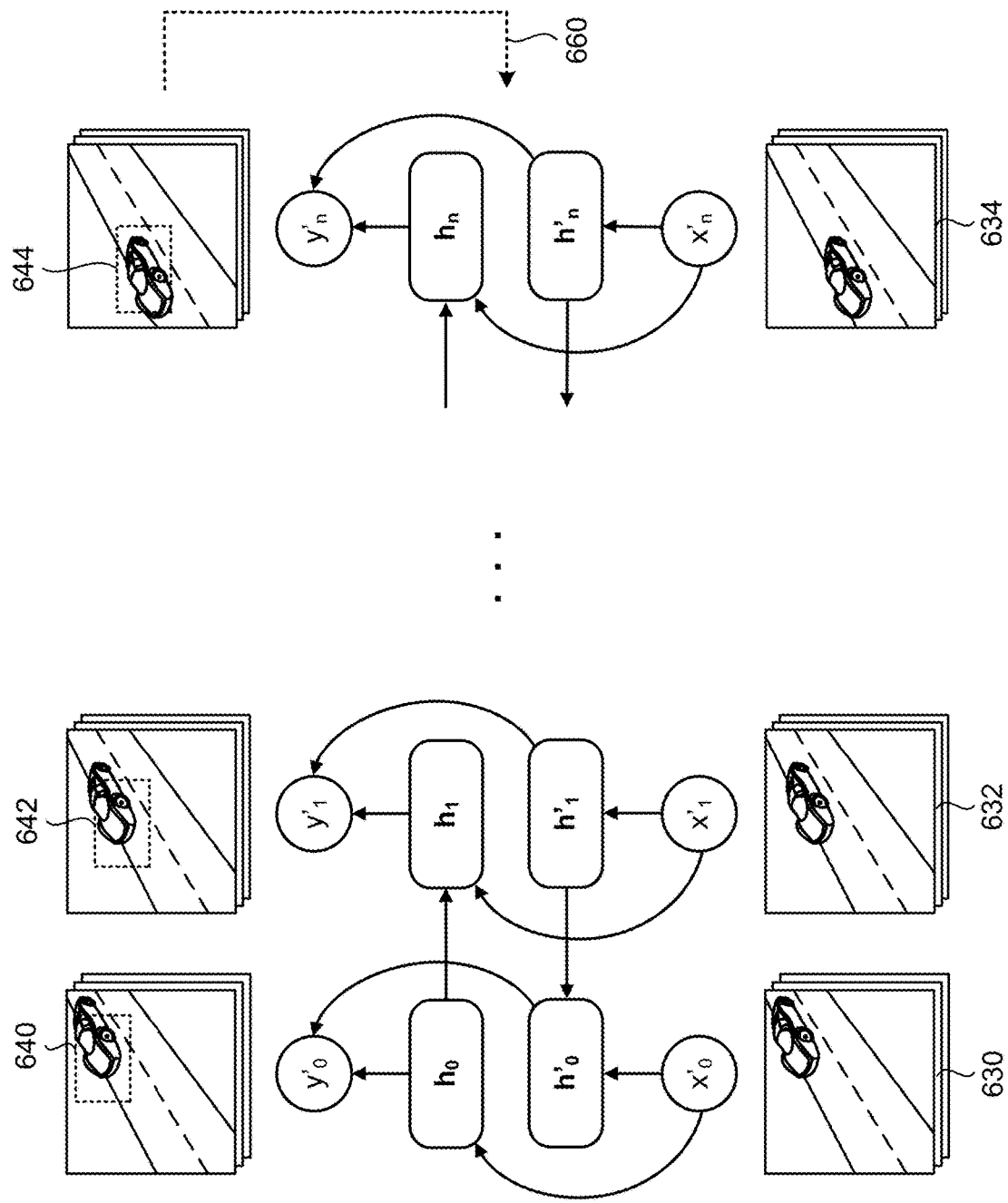
FIG. 6 illustrates an example process of training the bidirectional annotation model, according to an embodiment.

FIG. 6 illustrates an example process of training the bidirectional annotation model, according to an embodiment. As shown in FIG. 6, training data includes a sequence of images $\{x'_0, x'_1, \ldots, x'_n\}$ including images 630, 632, and 634 illustrating a vehicle on a road. During the forward pass step, the training module 514 generates a set of estimated annotations $\{y'_0, y'_1, \ldots, y'_n\}$ for the sequence including estimations 640, 642, and 644. Specifically, the training module 514 generates a set of forward states $\{h_{0,f}, h_{1,f}, \ldots, h_{n,f}\}$ by propagating the first image 630 of the sequence through the annotation model in a forward direction. The training module 514 generates a set of backward states $\{h_{0,f}, h_{1,f}, \ldots, h_{n,f}\}$ by propagating the last image 634 of the sequence through the annotation model in a backward direction. The training module 514 generates the set of estimated annotations $\{y'_0, y'_1, \ldots, y'_n\}$ by combining the forward states and backward states. The training module 514 determines the loss function based on the estimated annotations and the annotations for the sequence of training images. During the backward pass step, the training module 514 updates the parameters of the bidirectional annotation model to reduce the determined loss function, as shown by the arrow 660 in FIG. 6.

Returning to FIG. 5, the annotation module 518 receives training data to be annotated from the model training system 130, and coordinates with various client devices 116 to determine and verify annotations for the training data. Specifically, the annotation module 518 may also be responsible for providing the interface on the client devices 116 that allow human annotators to interact with the annotation system 140. The annotation module 518 may provide rendering information that contains code to render the display elements of the interface to client devices 116. Through the interface, the annotation module 518 may display images to be annotated, or may facilitate the annotation process for human operators.

In one embodiment, when, for example, the received training data is a sequence of images, the annotation module 518 determines a set of annotations by applying the bidirectional annotation model to the sequence of images. The annotation module 518 may then display the set of annotations on the client devices 116, such that the human operators can verify the annotations, or correct the annotations if needed. The verified annotations are provided to the model training system 130, such that the model training system 130 can use them to train computer models for the autonomous control system 110.

In another embodiment, the annotation module 518 suggests annotations on the interface of a client device 116 based on the interactions of the human operator with an image. Specifically, the annotation module 518 determines a set of predictions for a training image by applying an annotation model. The annotation module 518 displays the training image but not the generated predictions on the client device 116. The annotation module 518 determines whether the human operator has interacted with the image, along with the location of the interaction on the image. For example, the interaction may be the operator hovering over a location with a pointing device. As another example, the interaction may be the operator clicking on the location.

The annotation module 518 identifies one or more predictions that correspond to the location of the interaction. For example, annotation predictions may be selected if the boundaries of the predictions contain the location of the interaction. As another example, predictions may be selected if the regions enclosed by the predictions contain the location of the interaction. The annotation module 518 displays the identified predictions on the client device 116 such that the human operators can verify the suggested annotations, or manually draw another annotation if needed. The verified annotations are provided to the model training system 130 such that the model training system 130 can use them to train computer models for the autonomous control system 110.

In another embodiment, the annotation module 518 updates annotations for an overlapping set of objects based on input received from human operators. The annotation module 518 displays an annotated sensor image containing an overlapping set of objects on the client device 116 for review by a human operator. The annotation for the sensor image may be an incorrect annotation that groups the objects into a single label. For example, the objects may be occluded vehicles, occluded pedestrians, people on bicycles, and the like. In one instance, the annotation for the sensor image may be selected from a set of predictions for the sensor image that are generated by an annotation model. In such an instance, the incorrect annotation may be selected due to its high prediction likelihood, while correct annotations that label the individual objects are not selected due to lower prediction likelihoods generated by the annotation model.

The annotation module 518 receives input from the client device 116 that correctly identify one or more individual objects in the overlapping set. Based on the original label and the labels generated by the human operator, the annotation module 518 identifies annotations for the remaining objects in the set that were not annotated by the human operator. The annotation module 518 displays the identified annotations on the client device 116 such that the human operators can verify the suggested annotations, or manually draw another annotation if the identified annotation is still incorrect.

In one instance, the annotation module 518 identifies annotations for the remaining objects by eliminating annotations in the set that significantly overlap with the labels generated by the human operator. The annotation module 518 identifies annotations that have the next-highest prediction likelihoods in the set as the annotations for the remaining objects. For example, the annotation module 518 may eliminate annotations in the set in which a ratio of the overlapping area to the area of the label generated by the human operator is above a predetermined threshold, and identify the annotations that have the next-highest prediction likelihoods as the annotations for the remaining objects.

In another instance, the annotation module 518 may adjust the prediction likelihoods of the set of annotations to take into account the labels generated by the human operator. For example, the existing prediction likelihoods in the set of annotations may be adjusted to conditional likelihoods that are conditioned on the label generated by the human operator. As another example, the annotation model may be trained to take into account human input, and responsive to receiving the labels generated by the human operator, re-applied to the image to generate an updated set of annotations with new prediction likelihoods. For example, a neural network annotation model trained to take into account human input may be re-applied to the image to generate the updated set of annotations. The annotation module 518 may then identify annotations that are associated with the highest prediction likelihoods as the annotations for the remaining objects.

The verified annotations are provided to the model training system 130 such that the model training system 130 can use them to train computer models for the autonomous control system 110.

Methods

Figure 7:
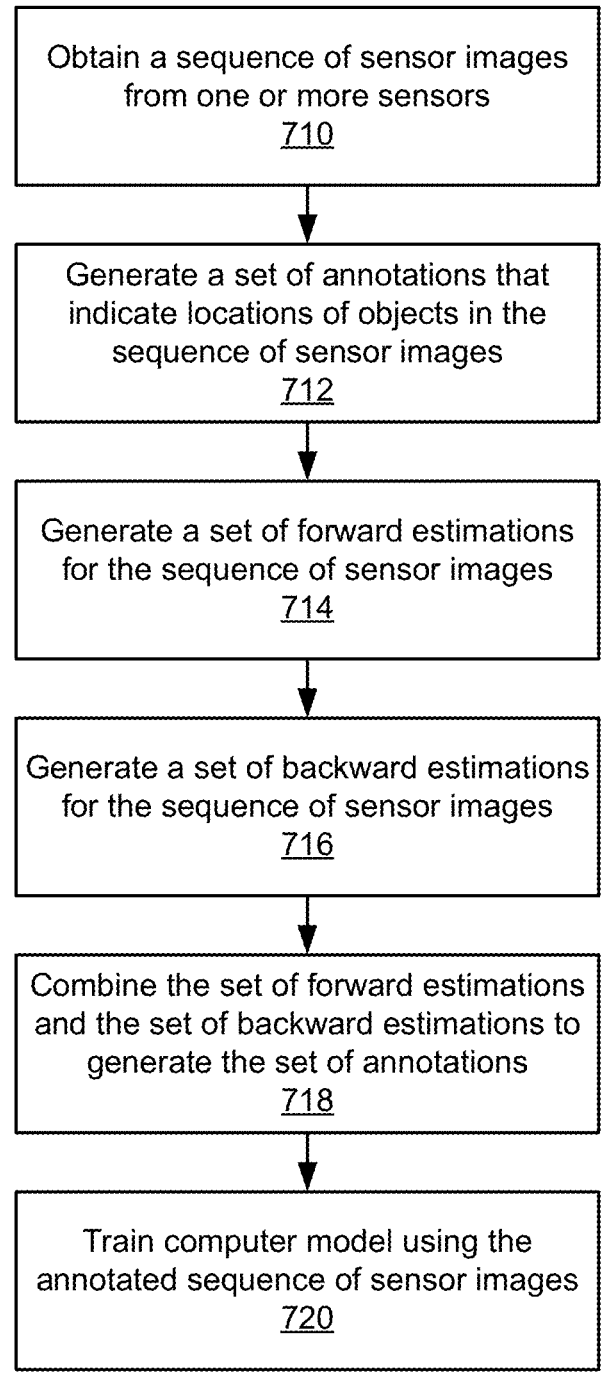
FIG. 7 is a flowchart illustrating a process of generating annotations for objects in a sequence of sensor images, according to one embodiment.

FIG. 7 is a flowchart illustrating a process of generating annotations for objects in a sequence of sensor images, according to one embodiment. The annotation system obtains 710 a sequence of sensor images from one or more sensors. The sequence of sensor images include sensor measurements that sense a surrounding environment of the one or more sensors. The annotation system generates 712 a set of annotations that indicate locations of the objects in the sequence of sensor images. The set of annotations are generated by applying a bidirectional machine-learned model to the sequence of sensor images. Specifically, the annotation system generates 714 a set of forward estimations for the sequence of sensor images by propagating a first sensor image of the sequence through the bidirectional machine-learned model in a forward direction. The annotation system generates 716 a set of backward estimations for the sequence of sensor images by propagating a last sensor image of the sequence through the bidirectional machine-learned model in a backward direction. The annotation system combines 718 the set of forward estimations and the set of backward estimations to generate the set of annotations. A model training system trains 720 a computer model using the annotated sequence of sensor images.

Figure 8:
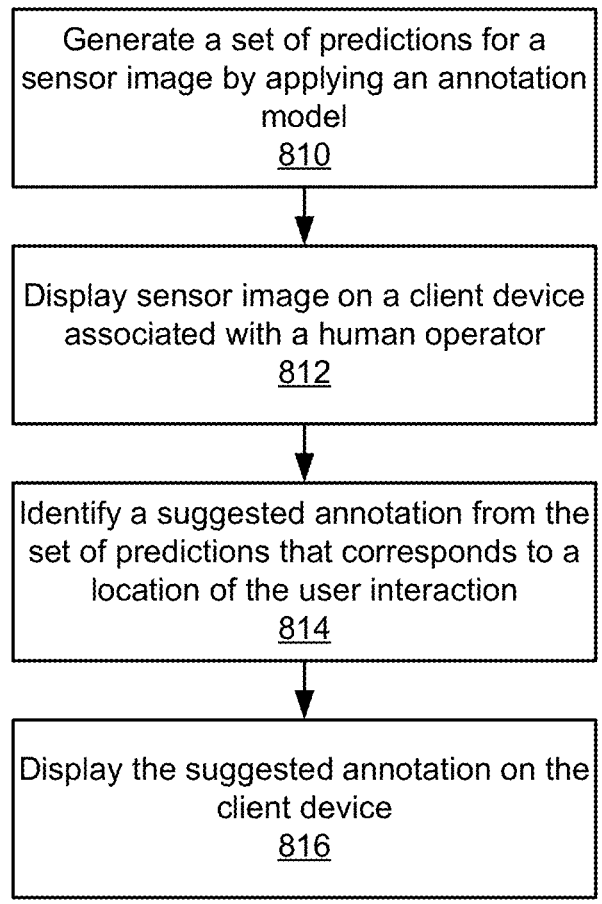
FIG. 8 is a flowchart illustrating a process of suggesting an annotation for an object in a sensor image, according to one embodiment.

FIG. 8 is a flowchart illustrating a process of suggesting an annotation for an object in a sensor image, according to one embodiment. The annotation system generates 810 a set of predictions for the sensor image by applying an annotation model to the sensor image. Each prediction indicates a possible location of the object on the sensor image. The annotation system displays 812 the sensor image on a client device associated with a human operator. The set of predictions are not displayed on the sensor image. Responsive to the human operator interacting with the sensor image on the client device, the annotation system identifies 814 the suggested annotation from the set of predictions that corresponds to a location of the user interaction on the sensor image. The annotation system displays 816 the suggested annotation on the client device.

Figure 9:
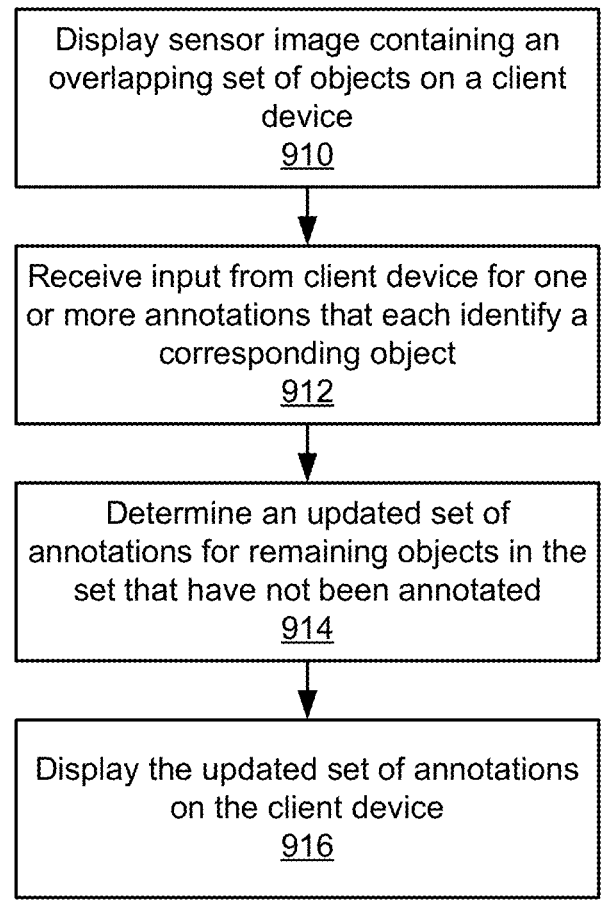
FIG. 9 is a flowchart illustrating a process of updating an annotation for an overlapping set of objects in a sensor image, according to one embodiment.

FIG. 9 is a flowchart illustrating a process of updating an annotation for an overlapping set of objects in a sensor image, according to one embodiment. The annotation system displays 910 the sensor image on a client device associated with a human operator. The annotation for the sensor image groups the overlapping set of objects into a single label. The annotation system receives 912 input from the client device for one or more annotations that each identify a corresponding object in the overlapping set of objects. Responsive to receiving the input from the client device, the annotation system 914 determines an updated set of annotations for remaining objects that have not been annotated by the human operator. The updated set of annotations are determined based on the original annotation for the sensor image and the one or more annotations identified by the human operator. The annotation system displays 916 the updated set of annotations on the client device.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method of generating annotations for objects in a sequence of sensor images, comprising:
   obtaining the sequence of sensor images from one or more sensors, the sequence of sensor images including sensor measurements that sense a surrounding environment of the one or more sensors;
   generating a set of annotations that indicate locations of the objects in the sequence of sensor images, the set of annotations generated by applying a bidirectional machine-learned model to the sequence of sensor images, comprising:
      generating a set of forward estimations for the sequence of sensor images by propagating a first sensor image of the sequence through the bidirectional machine-learned model in a forward direction,
      generating a set of backward estimations for the sequence of sensor images by propagating a last sensor image of the sequence through the bidirectional machine-learned model in a backward direction, and
      combining the set of forward estimations and the set of backward estimations to generate the set of annotations; and
   training a computer model using the annotated sequence of sensor images.

2. The method of claim 1, wherein a forward estimation for a corresponding sensor image is generated from a forward estimation for a previous sensor image in the sequence.

3. The method of claim 1, wherein a backward estimation for a corresponding sensor image is generated from a backward estimation for a future sensor image in the sequence.

4. The method of claim 1, wherein the bidirectional machine-learned model is a neural network model.

5. The method of claim 4, wherein the bidirectional machine-learned model is a recurrent neural network (RNN) or a long short term memory (LSTM) network model.

6. The method of claim 1, wherein the set of annotations are bounding boxes that enclose the objects in the sensor images.

7. A method of suggesting an annotation for an object in a sensor image, comprising:
   generating a set of predictions for the sensor image by applying an annotation model to the sensor image, each prediction indicating a possible location of the object on the sensor image,
   displaying the sensor image on a client device associated with a human operator, wherein the set of predictions are not displayed on the sensor image;
   responsive to the human operator interacting with the sensor image on the client device, identifying the suggested annotation from the set of predictions that corresponds to a location of the user interaction on the sensor image; and
   displaying the suggested annotation on the client device.

8. The method of claim 7, wherein the human operator interacting with the sensor image is the human operator hovering a pointer over the location on the sensor image with a pointing device.

9. The method of claim 7, wherein the human operator interacting with the sensor image is the human operator clicking on the location on the sensor image with a pointing device.

10. The method of claim 7, wherein the set of predictions are bounding boxes, and wherein a boundary of the bounding box for the suggested annotation contains the location of the user interaction on the sensor image.

11. The method of claim 7, wherein the set of predictions are bounding boxes, and wherein an area of the bounding box for the suggested annotation contains the location of the user interaction on the sensor image.

12. The method of claim 7, further comprising receiving an indication from the client device verifying the suggested annotation or requesting to manually label an alternative annotation for the object on the sensor image.

13. The method of claim 7, wherein each prediction in the set of predictions is associated with a corresponding likelihood, and wherein the likelihood for the suggested annotation is not the highest likelihood in the set of predictions.

14. A method of updating an annotation for an overlapping set of objects in a sensor image, comprising:
   displaying the sensor image on a client device associated with a human operator, wherein the annotation for the sensor image groups the overlapping set of objects into a single label;

receiving input from the client device for one or more annotations that each identify a corresponding object in the overlapping set of objects;

responsive to receiving the input from the client device, determining an updated set of annotations for remaining objects that have not been annotated by the human operator, wherein the updated set of annotations are determined based on the original annotation for the sensor image and the one or more annotations identified by the human operator; and displaying the updated set of annotations on the client device.

15. A system comprising one or more processors and computer storage media storing instructions that when executed by the one or more processors, cause the processors to perform operations comprising:

obtaining a sequence of sensor images from one or more sensors, the sequence of sensor images including sensor measurements that sense a surrounding environment of the one or more sensors;

generating a set of annotations that indicate locations of objects in the sequence of sensor images, the set of annotations generated by applying a bidirectional machine-learned model to the sequence of sensor images, comprising:

generating a set of forward estimations for the sequence of sensor images by propagating a first sensor image of the sequence through the bidirectional machine-learned model in a forward direction, generating a set of backward estimations for the sequence of sensor images by propagating a last sensor image of the sequence through the bidirectional machine-learned model in a backward direction, and combining the set of forward estimations and the set of backward estimations to generate the set of annotations; and training a computer model using the annotated sequence of sensor images.

16. The system of claim 15, wherein a forward estimation for a corresponding sensor image is generated from a forward estimation for a previous sensor image in the sequence.

17. The system of claim 15, wherein a backward estimation for a corresponding sensor image is generated from a backward estimation for a future sensor image in the sequence.

18. The system of claim 15, wherein the bidirectional machine-learned model is a neural network model.

19. The system of claim 18, wherein the bidirectional machine-learned model is a recurrent neural network (RNN) or a long short term memory (LSTM) network model.

20. The system of claim 15, wherein the set of annotations are bounding boxes that enclose the objects in the sensor images.

* * * * *